US009586378B2

(12) United States Patent
Le Monnier

(10) Patent No.: US 9,586,378 B2
(45) Date of Patent: Mar. 7, 2017

(54) CELL-LIKE STRUCTURE MANUFACTURING METHOD, CELL-LIKE STRUCTURE AND CORRESPONDING EQUIPMENT

(71) Applicant: Marc Le Monnier, Issoire (FR)

(72) Inventor: Marc Le Monnier, Issoire (FR)

( * ) Notice: Subject to any disclaimer, the term of this patent is extended or adjusted under 35 U.S.C. 154(b) by 548 days.

(21) Appl. No.: 13/724,362

(22) Filed: Dec. 21, 2012

(65) Prior Publication Data

US 2013/0112344 A1     May 9, 2013

Related U.S. Application Data

(63) Continuation of application No. 12/936,028, filed as application No. PCT/FR2009/000407 on Apr. 7, 2009, now abandoned.

(30) Foreign Application Priority Data

Apr. 8, 2008   (FR) .................................. 08/01929

(51) Int. Cl.
    *B32B 3/12*      (2006.01)
    *B23K 26/26*      (2014.01)
    (Continued)

(52) U.S. Cl.
    CPC ............... *B32B 3/12* (2013.01); *B23K 26/26* (2013.01); *B29C 53/28* (2013.01); *B29C 65/1661* (2013.01); *B29C 65/1664* (2013.01); *B29C 65/1674* (2013.01); *B29C 65/1677* (2013.01); *B29C 65/7891* (2013.01);
    (Continued)

(58) Field of Classification Search
    CPC ...................................................... B32B 3/12
    USPC ..... 165/272.8; 156/205, 197, 469, 470, 471, 156/292, 322; 428/116, 118
    See application file for complete search history.

(56) References Cited

U.S. PATENT DOCUMENTS

| 2,747,064 A | 5/1956 | Van Pappelendam |
| 5,139,596 A * | 8/1992 | Fell ................................ 156/205 |

(Continued)

FOREIGN PATENT DOCUMENTS

| DE | 19748917 A1 | 10/1998 |
| DE | 10007496 C1 | 4/2001 |
| DE | 202007000175 U1 | 5/2007 |
| FR | 1181531 A | 6/1959 |
| FR | 1532509 A | 7/1968 |
| FR | 2810911 A1 | 1/2002 |
| FR | 2829416 A1 | 3/2003 |

(Continued)

OTHER PUBLICATIONS

International Search Report issued Apr. 1, 2010 re: PCT/FR2009/000407; pp. 10; citing: WO 2004/026572 A1, FR 2 810 911 A1, FR 2 829 416 A1, U.S. Pat. No. 5,399,221 A, WO 92/09431 A1, US 2005/237895 A1, U.S. Pat. No. 5,948,172 A, US 2006/237401 A1 DE 20 2007 000175 U1, DE 100 07 496 C1, DE 197 48 917 A1, FR 1 181 531 A, U.S. Pat. No. 2,747,064 A and GB 2 044 168 A.

*Primary Examiner* — Michael N Orlando
*Assistant Examiner* — Elizabeth Bradford
(74) *Attorney, Agent, or Firm* — Cantor Colburn LLP

(57) ABSTRACT

Method for manufacturing a cell-like honeycomb structure, formed from a plurality of thermoplastic sheets attached to each other, wherein contoured areas are provided in each sheet, and each free sheet is attached to an adjacent sheet of an intermediate block formed by the different sheets previously attached therebetween, welding at least some of the flat areas contacting this free sheet and this adjacent sheet with a laser source along a continuous line parallel to the contour axis.

17 Claims, 10 Drawing Sheets

(51) Int. Cl.
*B29C 53/28* (2006.01)
*B29C 65/00* (2006.01)
*B29D 99/00* (2010.01)
*B32B 37/06* (2006.01)
*B32B 38/06* (2006.01)
*B29C 51/22* (2006.01)
*B29C 65/16* (2006.01)
*B29C 65/78* (2006.01)
*B29L 31/60* (2006.01)

(52) U.S. Cl.
CPC ........ *B29C 66/1122* (2013.01); *B29C 66/438* (2013.01); *B29C 66/73921* (2013.01); *B29C 66/8362* (2013.01); *B29D 99/0089* (2013.01); *B32B 37/06* (2013.01); *B32B 38/06* (2013.01); *B23K 2201/02* (2013.01); *B29C 51/225* (2013.01); *B29C 65/1609* (2013.01); *B29C 65/1616* (2013.01); *B29C 65/1619* (2013.01); *B29C 65/1622* (2013.01); *B29C 65/1635* (2013.01); *B29C 65/1683* (2013.01); *B29C 65/1687* (2013.01); *B29C 65/7847* (2013.01); *B29C 2791/001* (2013.01); *B29C 2793/00* (2013.01); *B29C 2793/009* (2013.01); *B29C 2793/0027* (2013.01); *B29K 2995/0027* (2013.01); *B29L 2031/608* (2013.01); *Y10T 156/1039* (2015.01)

(56) References Cited

U.S. PATENT DOCUMENTS

| | | | |
|---|---|---|---|
| 5,267,959 A | * | 12/1993 | Forman ............. B29C 66/73921 604/103 |
| 5,399,221 A | | 3/1995 | Casella |
| 5,925,271 A | * | 7/1999 | Pollack et al. ........... 219/121.74 |
| 5,948,172 A | | 9/1999 | Neiheisel |
| 6,183,836 B1 | * | 2/2001 | Pflug .............................. 428/116 |
| 7,393,577 B2 | * | 7/2008 | Day et al. ..................... 428/121 |
| 2003/0130381 A1 | * | 7/2003 | Joachimi ................. B29C 66/71 524/88 |
| 2004/0095444 A1 | * | 5/2004 | Drummond et al. ........... 347/86 |
| 2005/0237895 A1 | | 10/2005 | Tanaka et al. |
| 2006/0219354 A1 | * | 10/2006 | Dehennau et al. ........ 156/272.8 |
| 2006/0237129 A1 | * | 10/2006 | Chen et al. ................ 156/272.8 |
| 2006/0237401 A1 | | 10/2006 | Amesbury et al. |
| 2006/0283544 A1 | * | 12/2006 | Mori ................... B29C 65/1654 156/272.8 |

FOREIGN PATENT DOCUMENTS

| | | |
|---|---|---|
| GB | 2044168 A | 10/1980 |
| WO | 8700119 A1 | 1/1987 |
| WO | 9209431 A1 | 6/1992 |
| WO | 9425258 A1 | 11/1994 |
| WO | 9841388 A1 | 9/1998 |
| WO | 0032382 A1 | 6/2000 |
| WO | 2004026572 A1 | 4/2004 |

* cited by examiner

CELL-LIKE STRUCTURE MANUFACTURING METHOD, CELL-LIKE STRUCTURE AND CORRESPONDING EQUIPMENT

CROSS-REFERENCE TO RELATED APPLICATION

This is a continuation of U.S. patent application Ser. No. 12/936,028 filed on 5 Jan. 2011 which was filed under 35 U.S.C. 371 as the National Phase of International Patent Application No. PCT/FR2009/000407 filed on 7 Apr. 2009 which claims priority to French Patent Application No. 08/01929 filed on 8 Apr. 2008, all of which said applications are herein incorporated by reference in their entirety.

TECHNICAL FIELD

The invention relates to a method for manufacturing a cell-like honeycomb type structure in plastic material. The invention also relates to the thereby obtained structure, as well as to an installation allowing such a method to be applied.

BACKGROUND

Cell-like structures of the honeycomb type in thermofusible material have been produced industrially for about twenty years. The most used polymer is polypropylene (PP) because of its lightness, of its low cost, of the ease of its application, of its excellent resistance to humidity and to most chemicals. Its recycling is easy. Honeycombs in polycarbonate (PC) and in polyetherimide (PEI) occupy niche markets, and there exist productions, for the time being marginal productions, in polyvinylchloride (PVC), in polyethylene terephthalate (PET) and in cellulose triacetate (CTA).

The main commercial outlet for these products is the sandwich panel, for which they make up the core. The upper and lower skins of the sandwich are thin and dense materials, for which the elastic tensile modulus is generally high. The sandwich structure with a cell-like core of the honeycomb type (i.e. for which the axis of the cells is perpendicular to the plane of the sheet, and designated in this way although the section of the cell is not always hexagonal) provides a rigidity/weight ratio and a compressive resistance/weight ratio without any counterparts. This is why building, automotive, furniture, aerospace, railway transport industries as well as ship-building increasingly resort to this technique.

Polypropylene honeycomb structures with very wide cells (up to 50 mm) are also used naked, or with a non-woven heat-adhered on their surface in order to prevent filling-in of the cells, in the fields of civil engineering and landscaping: reduced backfills, rainwater management.

The honeycomb core is generally made by extruding tubes (WO 94/25258) or elements with a rectangular section (WO 87/00119) having hexagonal cells. The tubes receive by co-extrusion an external cladding of a polymer with a lower melting point which will be used as an adhesive. These tubes or these beams are then cut to the intended length and stacked in order to form blocks. In the case of tubes, by having them pass in a long hot air oven, it is possible to melt the adhesive and after cooling, a consolidated block is obtained, easy to cut with a band saw in order to obtain plates with the desired length. The beams are then welded against each other with a hot blade (mirror weld).

These methods have a certain number of significant drawbacks: the use of a hot melt adhesive with a low melting point limits the thermomechanical resistance of the cell structure to a level which is clearly inferior than that of the constitutive polymer of said structure. Further, in order to withstand the pressure exerted on its flanks by the jaws which transport it through the oven, even if hot air softens it, the tubular honeycomb block should have minimum density. It is 80 kg/m$^3$ with polypropylene in the case of cells of small dimensions (typically a section of 8 mm) for the sandwich panel application. Now, for the large majority of the applications, one hardly needs more than 55 kg/m$^3$. This technical problem therefore prevents optimization of the weight and of the cost of the finished product.

Another consequence is that the cutting of the block into slices with a hot wire, which is more aesthetical than cutting with a band saw, can only be accomplished at a maximum rate of 10 cm per minute and with a risk of thermal degradation in the case of a polypropylene block with a density of 80 kg/m$^3$, and it is therefore not used. It becomes advantageous in the case of lighter honeycombs; thus 30 cm per minute may be attained with a polystyrene block with a density of 55 kg/m$^3$. On the other hand, by using stacking containers and jaws it is not possible to obtain blocks with a length of greater than 3 meters which complicates and in certain cases excludes the manufacturing of panels of large dimensions. There is also the problem posed by the extrusion screws, which are designed for a given type of polymer which prevents the manufacturer from proposing honeycombs in very different materials. Finally, it is impossible to transport a compact semi-finished product and to assemble it as a honeycomb with lightweight industrial means as close as possible to large users. As a conventional trailer truck can hardly take away more than 60 m$^3$ of honeycomb, the transport costs quickly become prohibitive.

There exist methods for continuously and directly manufacturing cell structures to the desired thickness. WO-A-9841388 describes the extrusion, by means of a die with several slots, of parallel sheets in a thermofusible material with production of compartments between the sheets. By alternating depressurization and fluid-filling in one compartment out of two, a cell structure is made. This method is more economical than the previous ones only for high plate thickness. Now, the latter is limited by the complexity of the technique to about thirty millimeters. Further, the density of the obtained product is higher.

WO-A-0032382 describes a honeycomb structure made by rotary thermoforming in vacuo. Two thermoformed areas form half-cells and are separated by a planar area being used as a folding line of the sheet along the width. Folding is carried out like an accordion so as to bring the half-cells closer together which, once they are juxtaposed, form a honeycomb structure. The ends of the cells are covered with planar areas. This honeycomb core manufacturing step, for maintaining the shape of the structure, requires that it be immediately followed by a step for adhering the skins forming the outer faces of the panel.

In other words, although the connection of the walls of the half-cells is contemplated in WO-A-0032382, this method requires that the panel be made completely and not only the sole honeycomb core. Further it does not allow modulation of the thickness, which remains very limited because of the thermoforming on a cylinder.

BRIEF SUMMARY

The present invention intends to provide a solution to the technical problems discussed earlier.

For this purpose, a method is provided for manufacturing a cell-like honeycomb structure, formed with several sheets of a thermoplastic material assembled with each other, a method in which areas are made, provided with embossments in each sheet, and each free sheet is assembled with an adjacent sheet of an intermediate block formed by the different sheets assembled together beforehand, by welding at least some of the planar areas in contact with this free sheet and with this adjacent sheet, with a laser source, along a continuous line parallel to the axis of the embossments.

By sheet-to-sheet welding in the vertical position, a block is built, for which the length may be infinite and the density very low. Further, the weld is more resistant mechanically and in temperature than a thermoplastic adhesive bond.

According to advantageous but not mandatory aspects of the invention, the method may incorporate one or more of the following features:

The thermoplastic material is a thermoformable material, and areas are made provided with embossments by vacuum thermoforming of each sheet, notably by means of a rotating cylindrical mold.

Vacuum thermoforming of each sheet is accomplished with a rotating cylindrical mold, rather than with a planar mold, so as to be able to produce a variable length of thermoformed sheet.

The whole surface of the cylinder is divided at regular spatial intervals into recessed splines, parallel to its axis and which almost extend from one end to the other of the width of the cylinder. The section of these splines in a plane perpendicular to the axis of the cylinder is a regular half-hexagon.

Vacuum thermoforming of a strip is carried out and then this strip is cut out in order to form different free sheets. For this purpose, at the outlet of the thermoforming line, the splined plastic strip is cut out by a guillotine to a selected length and the obtained leaves are for example stacked onto each other in a container.

Areas provided with embossments are made by compressively marking lines in alternation on a first face and an opposite face of the sheet, and then by exerting on either side of these folding lines, pressure forces in order to cause folding of the sheet. As an example, lines parallel to the width of the sheet, equidistant from each other, may be compressively marked, and then on either side of these folding lines pressure forces are exerted in opposite directions so as to cause the folding of the sheet in the longitudinal direction according to a half-hexagonal pattern.

The embodiment described in the previous paragraph is an alternative to vacuum thermoforming. As a non-limiting example, intended to illustrate this alternative embodiment, it is possible to fold the sheet under cold conditions, in particular according to the teaching of FR 1532509, by marking on its surfaces, by the pressure of the cylinders, lines parallel to the width of the sheet and equidistant from each other. A cylinder provided with thin rectilinear embossments located above the sheet will compressively mark two consecutive lines on the upper face of the sheet, and an identical cylinder placed under the sheet will then mark following both of these lines, two new lines on the lower face of the sheet. And the cycle is repeated endlessly. A set of actuators (compressed air nozzles, splined rollers) placed above and below the sheet causes the planar sheet to assume a three-dimensional shape, with a semi-hexagonal longitudinal profile, by folding along the lines scored beforehand on the faces of said sheet. Unlike vacuum thermoforming, folding does not cause material stretching. Therefore there is no shrinkage problem after cooling and the sheet has the same thickness everywhere. And unlike vacuum thermoforming, it is not required that the constitutive material of the sheet be airproof.

Each free sheet provided with embossments is heated up before welding it to the adjacent sheet of the intermediate block. For this purpose, on the welding station, the arm of a handling robot will for example grasp a format in the container and exhibit one of its faces to a panel of infrared radiating heaters.

The thereby pre-heated sheet is vertically introduced into the welding machine, where it will slide by gravity between two vertical planes, one made up by the fixed metal guides fitting the shape of the recessed embossments of the sheet and the other one by the wall of the honeycomb block being formed. By means of a mechanical device, the block has performed a small translational movement on the side so that the embossments of the block and of the sheet are in opposite phase and that the planar portions of these embossments are perfectly facing each other.

The block performs a displacement in order to place the sheet just introduced under pressure against the metal guides. The planar portions of the embossments facing each other of the block and of the sheet are now pressed against each other.

In the space located on the other side of the metal guides a horizontal plate is found, on which is attached an assembly of optical fibers each delivering a laser beam centered at the middle of the space separating two consecutive metal guides. The new sheet will therefore be attached on the block by a set of parallel welding lines passing through all the embossments of the block and of the sheet which are in contact but only through these embossments. For certain applications which do not require very high mechanical performances, only certain lines may be welded.

A laser source is for example used, emitting in range from visible light to middle infrared, i.e. with a minimum wavelength corresponding to the low limit of visible light, i.e. about 380 nanometers, as well as with a maximum wavelength of about 25 micrometers. Advantageously, a set of laser diodes is used as a laser source, emitting a wavelength comprised between 800 and 1,200 nanometers. Advantageously, the electromagnetic radiation from the laser source is transmitted through optical fibers.

Indeed, the width of the beam, the high yield, the great durability and the low congestion associated with a moderate cost for example makes laser diodes an ideal tool for generating weld lines with a width from 2 to 4 mm. The principle of the welding is based on the heating of the material by electromagnetic radiation. The welding of two plastic sheets maintained against each other by pressure may be accomplished:

1. either by transparence, which assumes that the plastic sheet is composed of two layers, one being "transparent" and the other one being absorbent in the near infrared. Most thermoplastic polymers do not absorb or only very little electromagnetic radiation in the wavelength interval of laser diodes. In order to make them very absorbent, it is sufficient to add a filler such as carbon black (1% by mass is sufficient). The ray passes through the transparent layer and its electromagnetic energy is converted into heat in the absorbent layer. The latter melts and by thermal conduction also causes surface melting of the other bilayer sheet on which it rests. After cooling, a good quality weld is obtained. This technique is known but has two drawbacks within the scope of manufacturing a honeycomb it is very difficult: to provide for each polymer a bilayer sheet with a thickness of less than 250 microns (micrometers), when lightness is sought. Further, a transparent material is often a virgin and non-recycled material.

2. or by conduction, which is a particularly advantageous aspect of the present invention. With this, it is possible to work with monolayer sheets in 100% recycled material containing carbon black. The weld rate expressed in meters per minute will be all the higher since the thickness of the sheet is small. The method is very well adapted to a thickness of 200 microns and less. The principle is to carefully raise the temperature of the plastic sheet until it imparts sufficient mobility to the macromolecules which make it up (in the case of a crystalline polymer, this is expressed by clear melting of the material), thus by diffusing the calories by conduction into the other sheet. As earlier, pressure should be exerted on both sheets, so that there is interpenetration of the macromolecules from one sheet to the other. Direct application of the laser beam which emerges from the optical fiber amounts to concentrating all the energy in a spot with a diameter from 2 to 4 mm. This causes oxidation of the absorbent sheet which is exposed here to the contact of air, i.e. irreversible degradation of the polymer. It is therefore advantageous to apply this energy gradually over a longer time without reducing the welding rate. This amounts to "extending" the spot into a segment with the same width and of a few centimeters long, which is displaced along the line to be welded. During its displacement over a given point of the sheet, the temperature will gradually rise until it exceeds the softening point of the polymer. This gradual rise in temperature is imparted to the sheet below, and it is sufficient to rapidly apply strong pressure on the welded line and then to let it cool.

Practically, for example from the laser source, a laser beam is generated, the laser beam is transformed into a laser segment, the width of which is substantially close to the diameter of this beam, and the length of which is much larger than this diameter, and this laser segment is displaced along said continuous line. Advantageously, the laser beam is directed towards a cylindrical mirror provided with facets and performing a rotary movement, so as to generate said segment.

Each facet which receives the beam projects it on the plastic sheet by making it thereby cover a line segment. The rotation of the mirror is sufficiently fast so that an "energy line" is generated from the spot. The great uniformity of the energy distribution of the laser inside a segment with a width of 3-4 mm and with a length of about fifteen centimeters allows the temperature of the plastic sheet to be raised until it makes the macromolecules mobile in a more gradual and better controlled way than the spot directly produced by the laser beam would do at the surface of the sheet. For polymers of ordinary use such as polypropylene and polystyrene, a power of the order of 100 W per welding line is sufficient for guaranteeing a high production rate. Of course, with this device, it is also possible to weld bilayer sheets by transparence without it being necessary to provide the least modification to the installation.

By a vertical movement of the plate, this set of energy segments will weld the sheet on the block, while generating welding lines inside the planar surfaces in contact. In order to allow interpenetration of material, each free sheet is pressed against the adjacent sheet, during the laser welding step and immediately after this step along said continuous line.

The block thereby augmented by one sheet performs a displacement in the direction of the production and then a small displacement in the transverse direction, while a new sheet is introduced from the top.

The preceding cycle begins again.

The invention also provides a cell-like honeycomb structure, formed with several sheets of a thermoformable material assembled together, each sheet being provided with an area of embossments, at least certain of the planar areas in contact of two adjacent sheets being assembled by means of a continuous welding line, parallel to the axis of the embossments.

According to an advantageous feature, the cell-like structure has a density of less than 80 kg/m$^3$, in particular less than 60 kg/m$^3$, with cells, for which the largest transverse dimension is less than 12 mm.

The invention further provides an installation for applying the method above, comprising:
  means for forming embossments in each sheet;
  means for setting into place each free sheet, in the vicinity of the adjacent sheet of the intermediate block;
  means for welding this free sheet with the adjacent sheet.
  means for applying pressure to each free sheet with this adjacent sheet.

According to other features:
  the welding means comprise a laser source, capable of generating a laser beam, as well as means for transforming this beam into a laser segment, with a length much greater than the diameter of the laser beam.
  the pressure means comprise first pressing members capable of putting the intermediate block in contact with the free sheet, as well as an additional pressing member, capable of penetrating into the cells of said intermediate block and of increasing the pressure between the free sheet and the adjacent sheet along said continuous line.

BRIEF DESCRIPTION OF THE DRAWINGS

The invention will be better understood and other advantages thereof will become more clearly apparent upon reading the following description of a method according to the invention and of an installation for applying this method, only given as an example and with reference to the appended drawings wherein.

DETAILED DESCRIPTION

Figure 1:
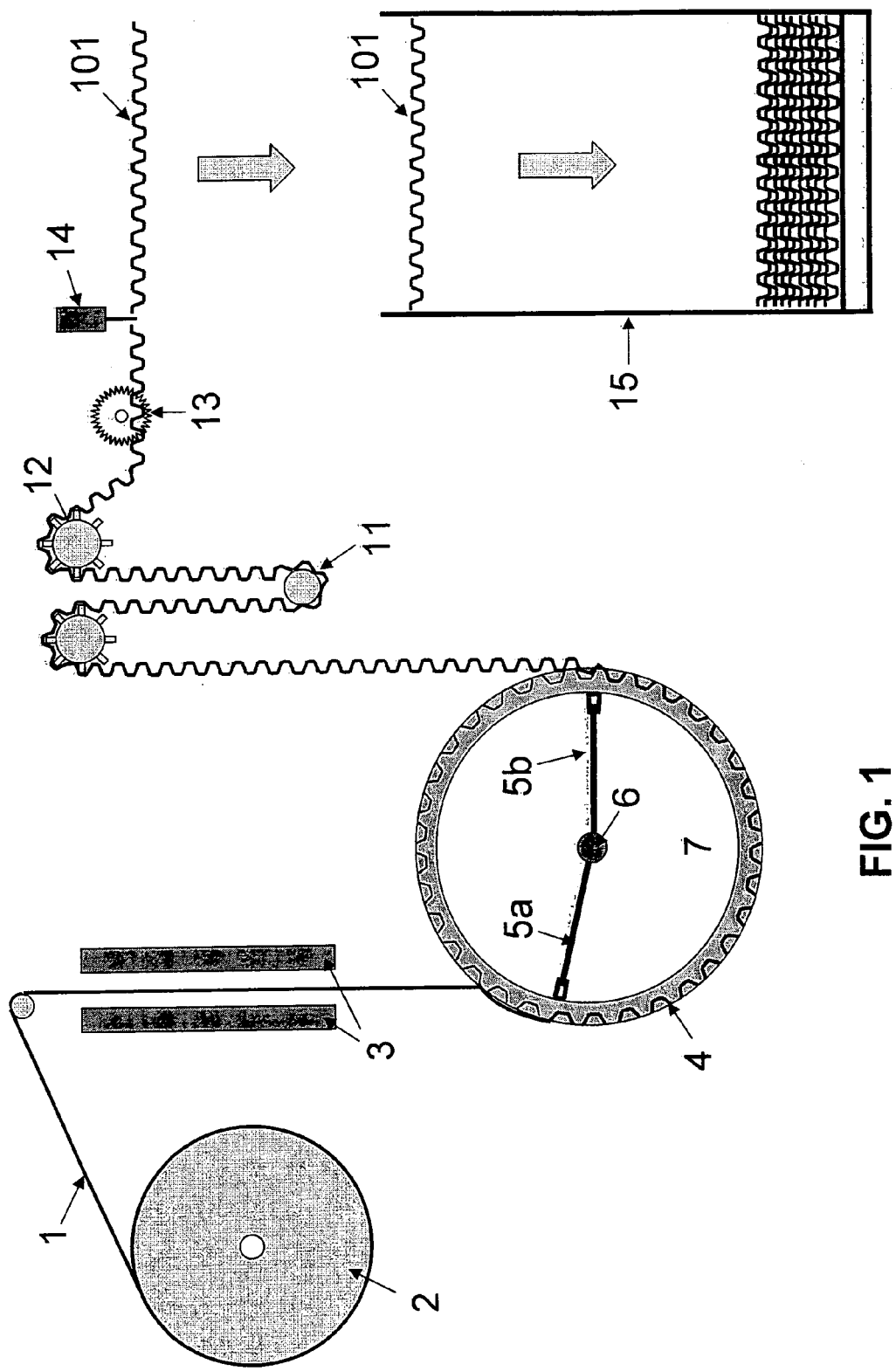
FIG. 1 is a schematic partial longitudinal sectional view of a thermoforming installation with a rotary cylinder allowing a plastic sheet to reproduce crimps of semi-hexagonal shape.

The installation illustrated in FIG. 1 comprises, on the left part of this figure, a strip 1 of sheet material delivered from a spool 2. This airproof sheet material is made in a thermoplastic material which is thermoformable in vacuo, with a thickness comprised between 0.1 and 1 mm (these values are not limiting). Such a thermoformable material is selected for example from polyolefins (polypropylene, polyethylene), polyesters, polystyrenes, polycarbonate, acrylonitrile-butadiene-styrene, polyetherimide and polyetheretherketone. It may be reinforced with glass, carbon fibers or aramide fibers which enhance the thermomechanical performances of the final product.

Figure 2:
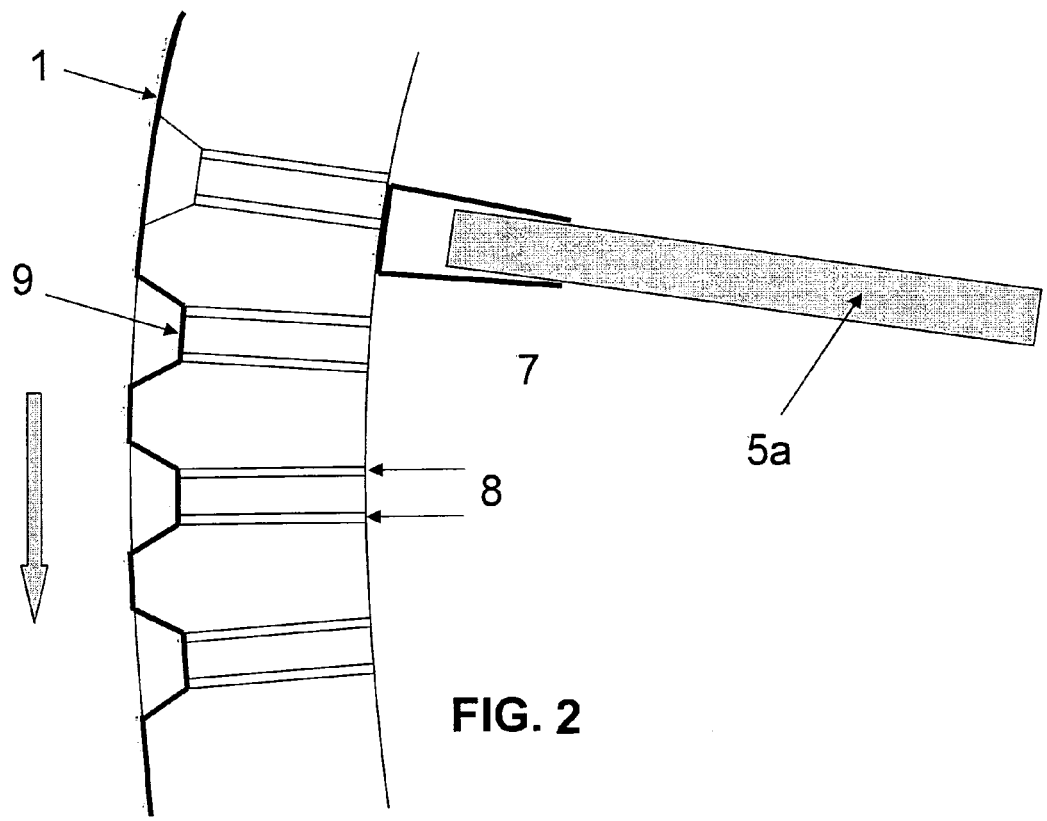
FIG. 2 describes thermoformed cells of the cylinder.

The strip is unfolded in the vertical position between two infrared radiating panels 3 which increase its temperature up to a few degrees below its melting point. By gravity, the hot strip is deposited at the surface of a slowly rotating thermoforming cylinder 4. A device not shown ensures the seal between the surface of the cylinder and the strip. The cylinder includes an aluminium sleeve with a thickness of about 30 mm, cooled by circulation of water. The surface has been machined in order to engrave recessed rectilinear splines, all identical and parallel to the axis of the cylinder. A set of flaps 5a and 5b firmly attached to the fixed axis 6 allows the interior of the cylinder to be divided into two sealed boxes. The lower box 7 is connected to a permanently operating vacuum pump. Thus when, in its movement of rotation, the cylinder brings the hot strip 1 at the box 7, the air comprised between the cylinder and the sheet is suddenly sucked up through vents 8 and the latter is flattened at the cavity bottom of the spline 9 (FIG. 2). It then perfectly reproduces the surface of the cylindrical mold which it will only leave after having sufficiently cooled by moving past the other end of the box 7.

Figure 3:
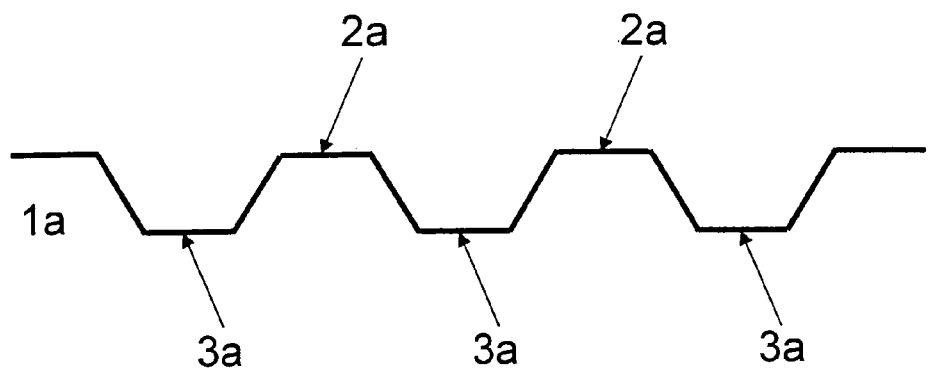
FIG. 3 is a simplified schematic view of a sheet portion, once the latter has been thermoformed in the installation of FIG. 1.

A splined strip 1a is therefore obtained, visible in a longitudinal sectional view in FIG. 3 and provided with crests 2a and of recesses 3a. These embossed areas 2a and 3a are planar. In other words, the thermoformed strip 1a looks like corrugated metal sheet. It passes through an accumulator 11 and then in front of a splined counting cylinder 12. The latter controls the guillotine 14 which will produce the strip 1a with the sought length after cutting edges with a pair of cutting disks 13. After the cutting of this strip 1a, different identical splined sheets are therefore obtained, bearing reference 101, which are deposited in a container 15, by means of a device not shown.

It is important to note that if this thermoforming line allows rapid switching from plastic material to another, specifically machined cylinders should be available for a given polymer, the shrinkage level of the sheet varying from one polymer to the other. By a fast change of cylinder, the same dimensional characteristics are guaranteed for the obtained formats.

Figure 4:
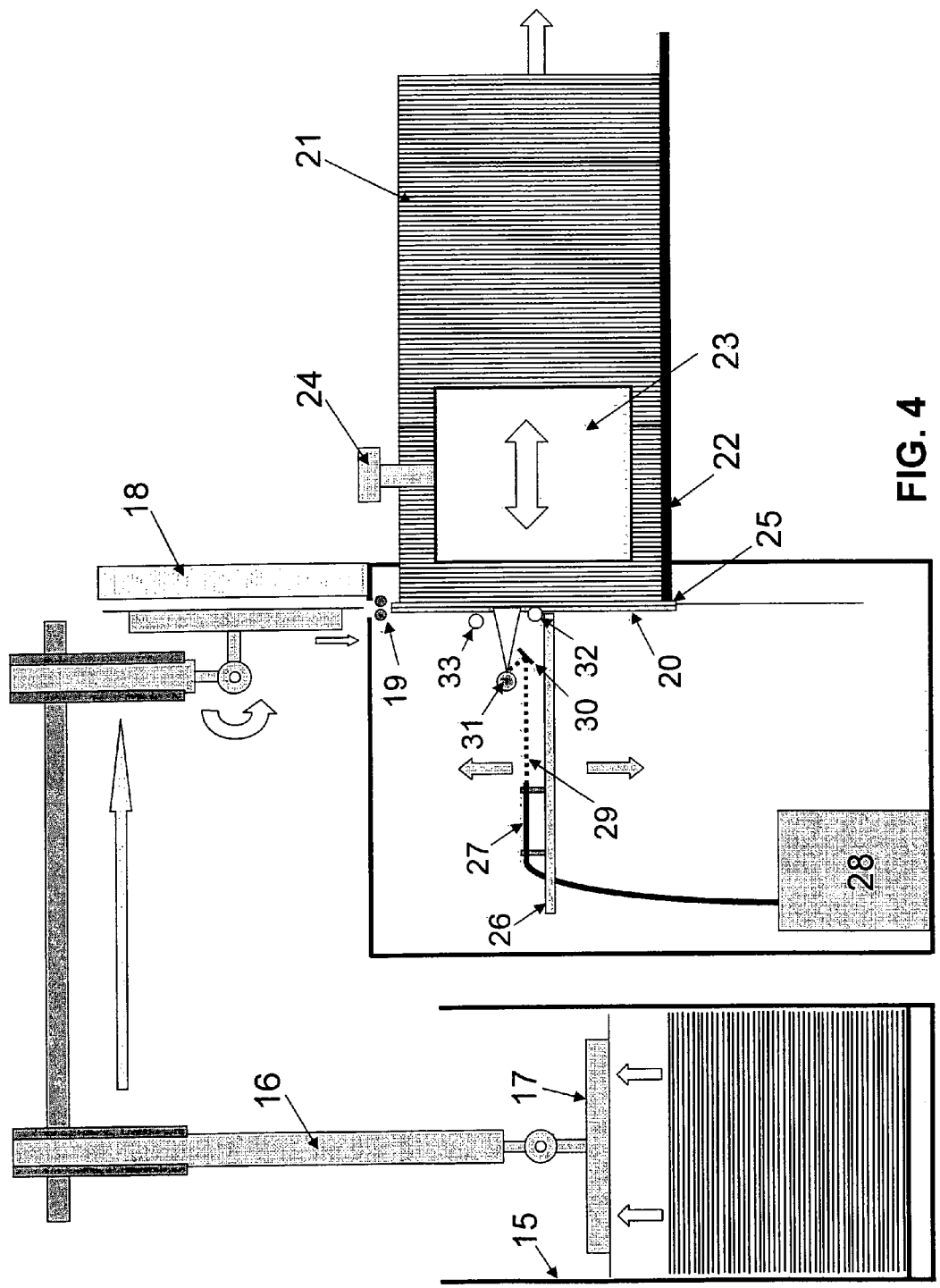
FIG. 4 is a schematic view of a machine for making honeycombs by laser welding of thermoformed plastic sheets.

The container 15 is positioned by centering devices on the ground in front of the laser welding machine, as indicated in FIG. 4. A handling arm 16 provided at its end with a gripping plate 17 successively picks up each sheet at the top of the stack, in order to present it to the infrared radiating panel 18. The purpose is to bring the temperature of the thermoformed sheet to the highest value possible while avoiding causing its deformation. Inside the welding machine, a device for heating the air (not shown) allows this temperature to be maintained. The purpose is to reduce the time required for the laser welding by starting at the highest possible point on the temperature rise curve.

Next, the arm transfers the hot sheet to a set of rotating rollers 19 which carry it away into the inside of the welder. This sheet moves down by gravity between steel guides 20 and the vertical wall of the intermediate honeycomb block 21 until it arrives in abutment on a smooth stainless steel horizontal plate 22. This intermediate block 21 is formed by different sheets 101, assembled beforehand. Two vertically positioned belt conveyers 23 exert permanent pressure on the flanks of the block and impart to it forward and backward movements. Both of these conveyers are firmly attached to a gantry 24 which itself moves them transversely, and alternately from left to right, so as to obtain a shift equal to ¾ of the length of a hexagonal cell, which allows the block and the sheet to come in opposite phase.

Figure 5:
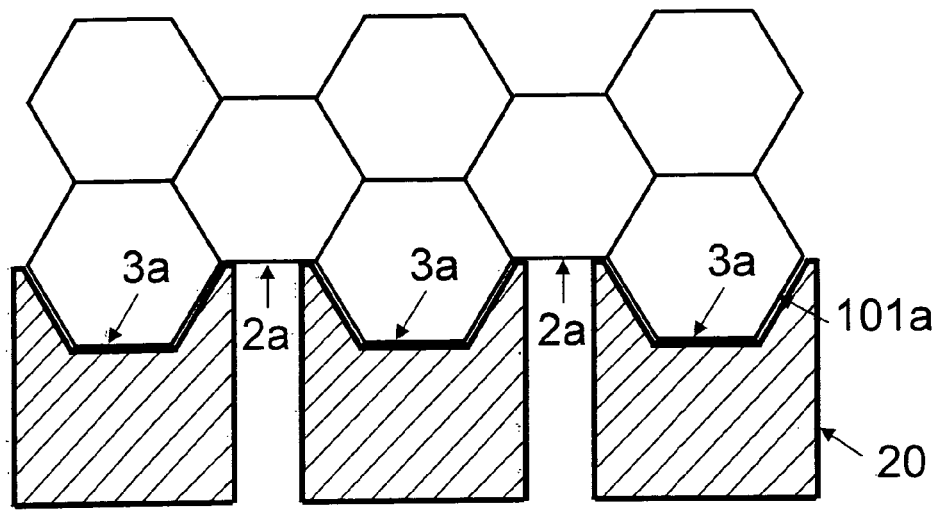
FIGS. 5, 6, 7, 8, 9 and 10 are sections in a horizontal plane inside the welder, which show the introduction of the sheet, its pressing against the block and welding by the laser rays.
Figure 6:
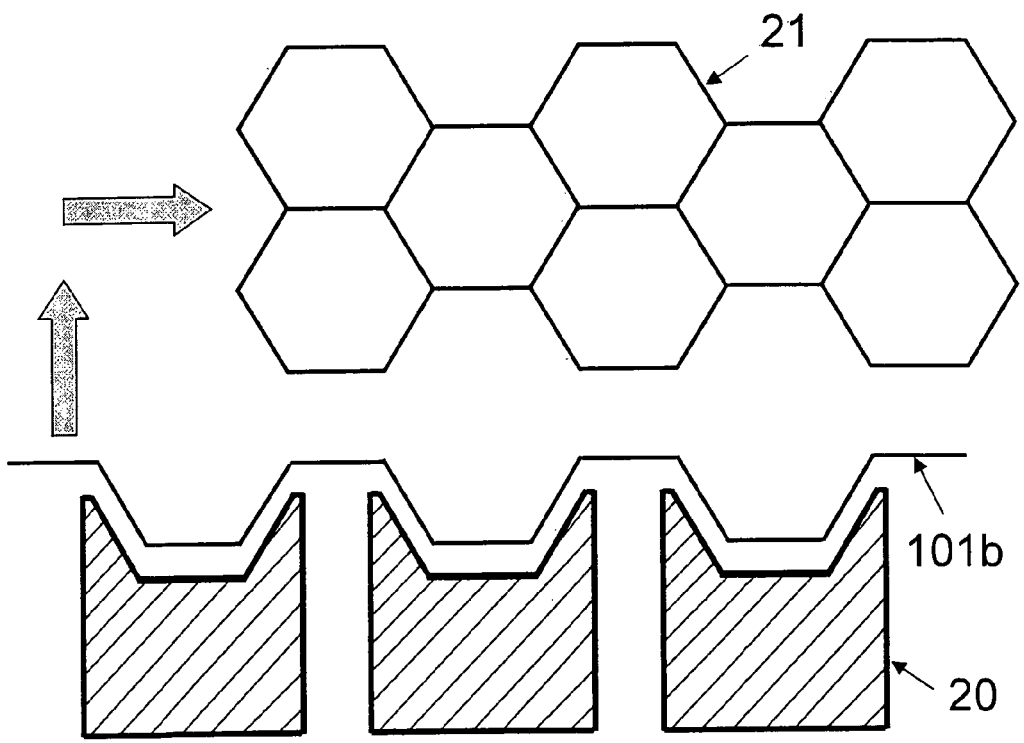

FIG. 5 is an enlargement of a section in a horizontal plane which shows the intermediate block, to which a last sheet 101a provided with its crests 2a and its recesses 3a will be added. FIG. 6 illustrates the simultaneous actions for moving forward the intermediate block 21 under the effect of the side conveyers 23 and of side translation of this block by ¾ of a cell length under the effect of the gantry, and then the insertion of an additional sheet, a so-called free sheet 101b.

Figure 7:
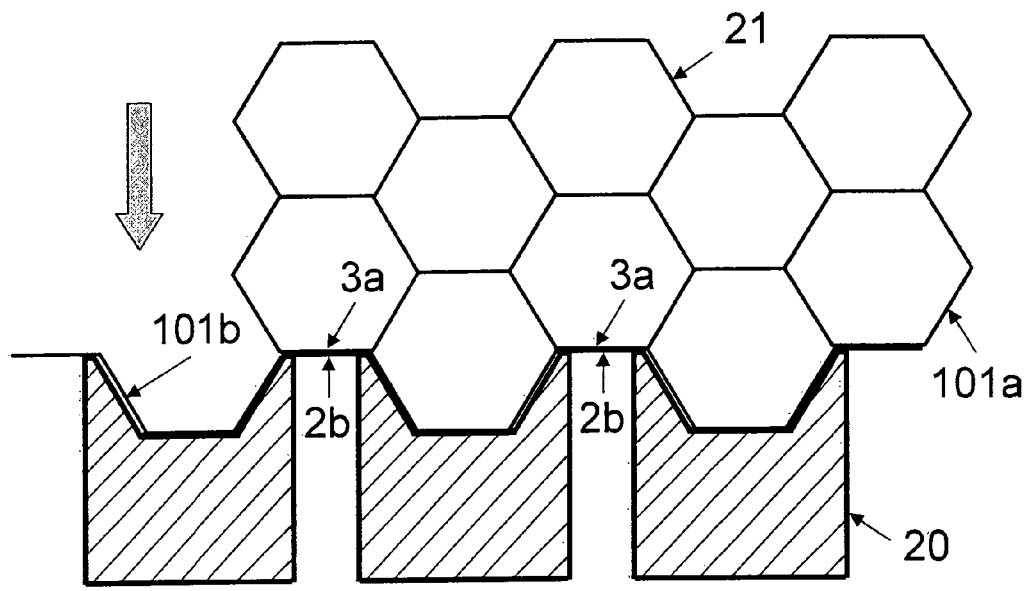
Figure 8:
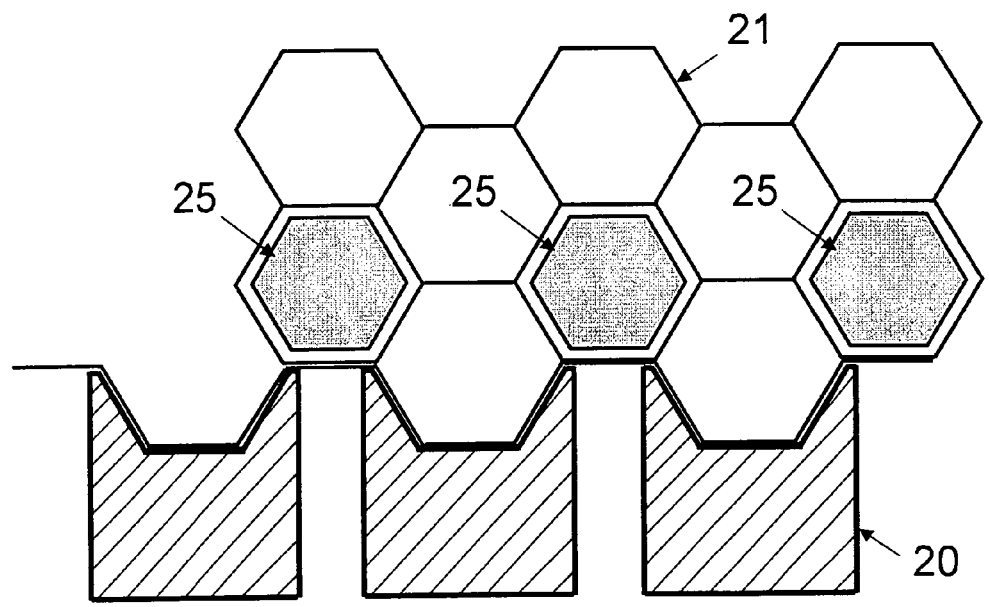
Figure 9:
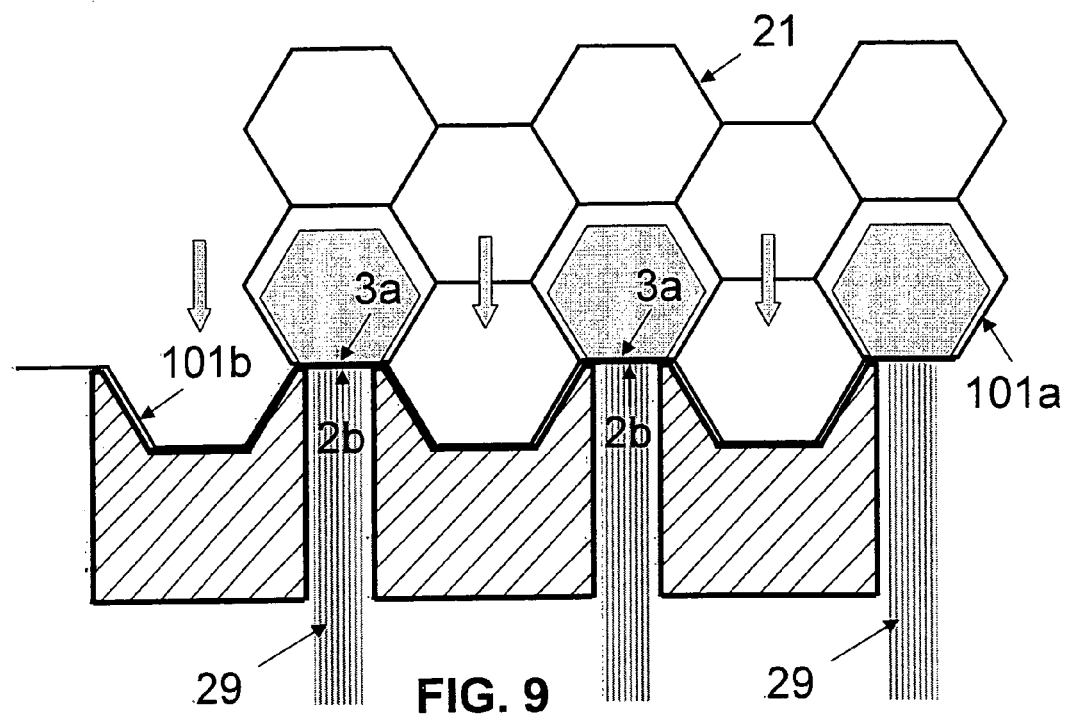
Figure 10:
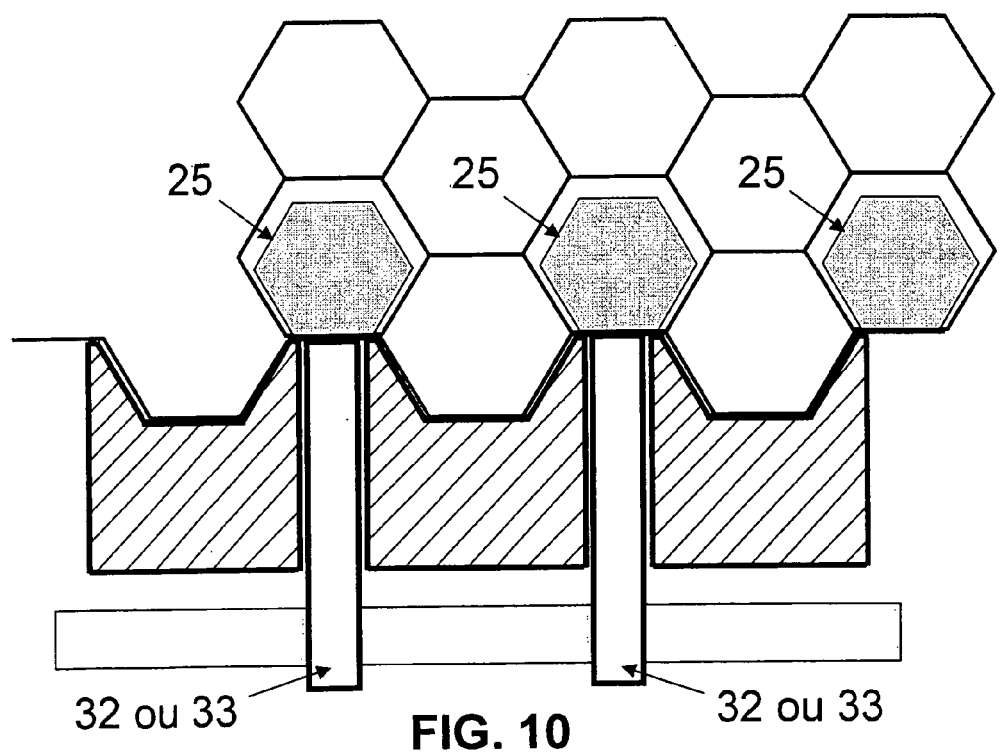

FIG. 7 illustrates the backward movement of the block 21, which puts the planar areas of the embossments 3a and 2b into contact belonging to the last sheet 101a of the block 21 and to the free sheet 101b respectively. Next, the steel or pultruded carbon profiles of a harrow 25 driven by pneumatic actuators are introduced inside the cells of the last row of the block 21, as shown in FIG. 8. As soon as it has crossed the whole height of the block 21, the harrow is flattened against the guides 20 so as to actually apply pressure to the planar areas of the embossments 3a and 2b (FIG. 9). The laser beams 29 will then melt these contact surfaces between the sheets 101a and 101b. Their passage is immediately followed by that of a rotary knurl 32 or 33 which exerts a strong point-like pressure on the very softened portions in order to cause interpenetration of materials between both sheets, while the harrow 25 ensures counter-pressure (FIG. 10).

Figure 11:
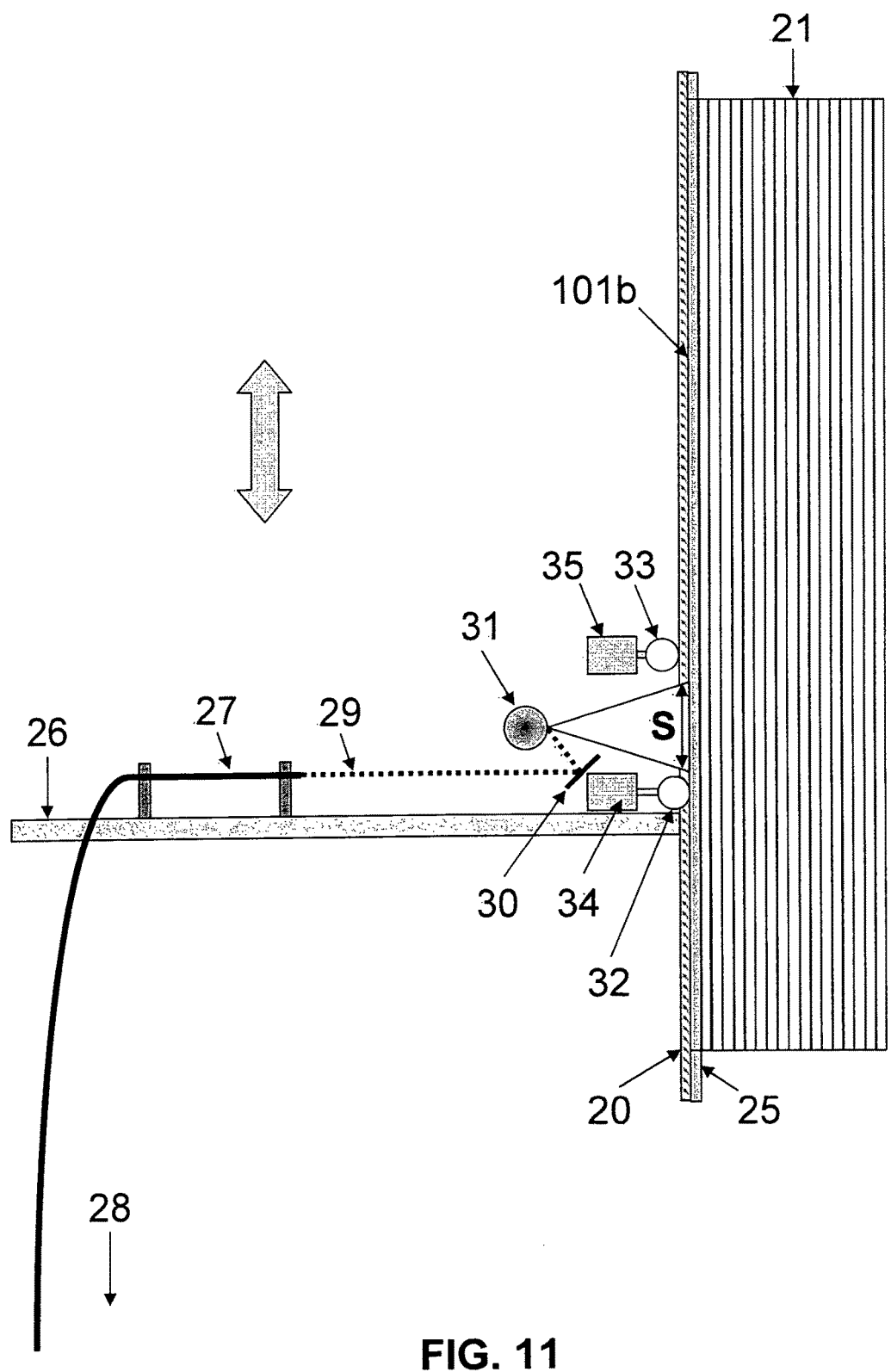
FIG. 11 explains how the energy segment is generated and by the means of which strong pressure is exerted on the melting welding line.

FIG. 11 shows a plate 26 driven by actuators moving upwards at a uniform speed from the bottom of the block in order to reach its top. During the next cycle, it will perform a reverse movement. On this plate, optical fibers 27 are mounted which transport the electromagnetic radiation generated by the laser diode sources 28. The optical fiber sends a laser beam 29 onto a return mirror 30 which transmits it to the multi-facet rotary mirror 31. The latter at the surface of the sheet 101b bearing upon the steel guides 20 by the pressure exerted by the block 21 and the harrow 25, generates an energy segment S with a width equal to the diameter of the spot, i.e. 2-4 mm, and with a length which may be varied between 10 and 15 cm.

The rotary knurls 32 and 33 have a width equal to the one which would have been selected for the segment. They are provided with a rubber flange, or a smooth TEFLON crown in the case when gradual fouling would have been noticed. There is one knurl for each welding line, and each line substantially corresponds to the centre of the planar area delimited by the embossments in contact 2b and 3a. When the movement of the plate 26 is upward, a set of pneumatic actuators 34 causes the knurls 32 to press against the sheet at the embossments 2b and 3a while the casters 33 remain set back. Conversely, when the plate moves downwards, the knurls 33 are the ones which will roll on the welding lines under the pressure of the actuators 35 while the casters 32 are set back.

Figure 12:
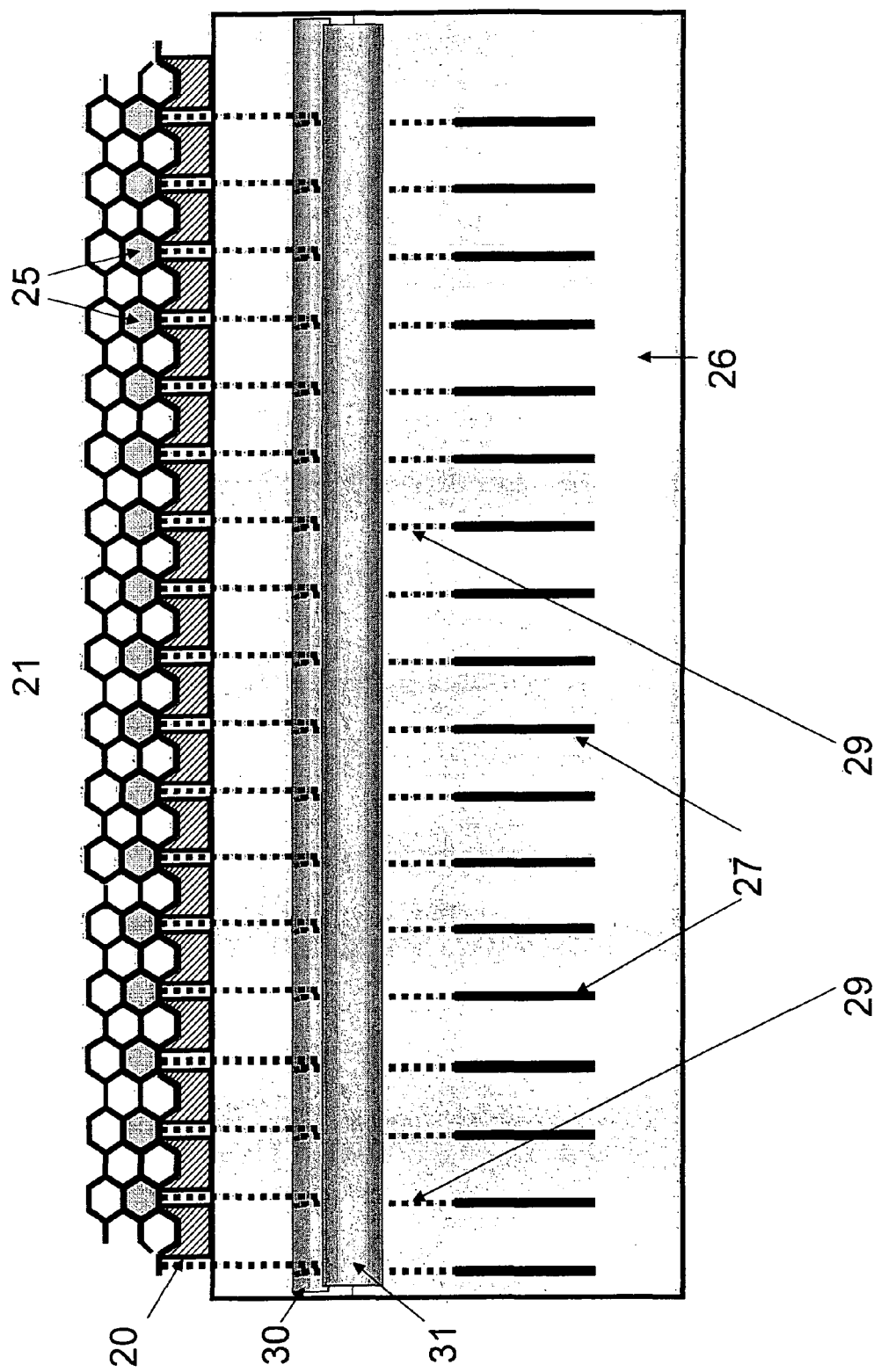
FIG. 12 is a top view of the plate which bears the optical welding device.

FIG. 12 is a top (partial) view of the plate showing the positioning of the optical fibers 27, of the laser rays 29, of the return mirror 30, of the rotary mirror 31. The knurls 32, 33 and the actuators 34, 35 have not been illustrated for better understanding. As soon as the plate 26 has arrived at the end of travel, the side conveyers 23 move the block 21 forwards and a new free sheet, i.e. not yet assembled, is introduced from the top of the machine. The cycle begins again.

Figure 13:
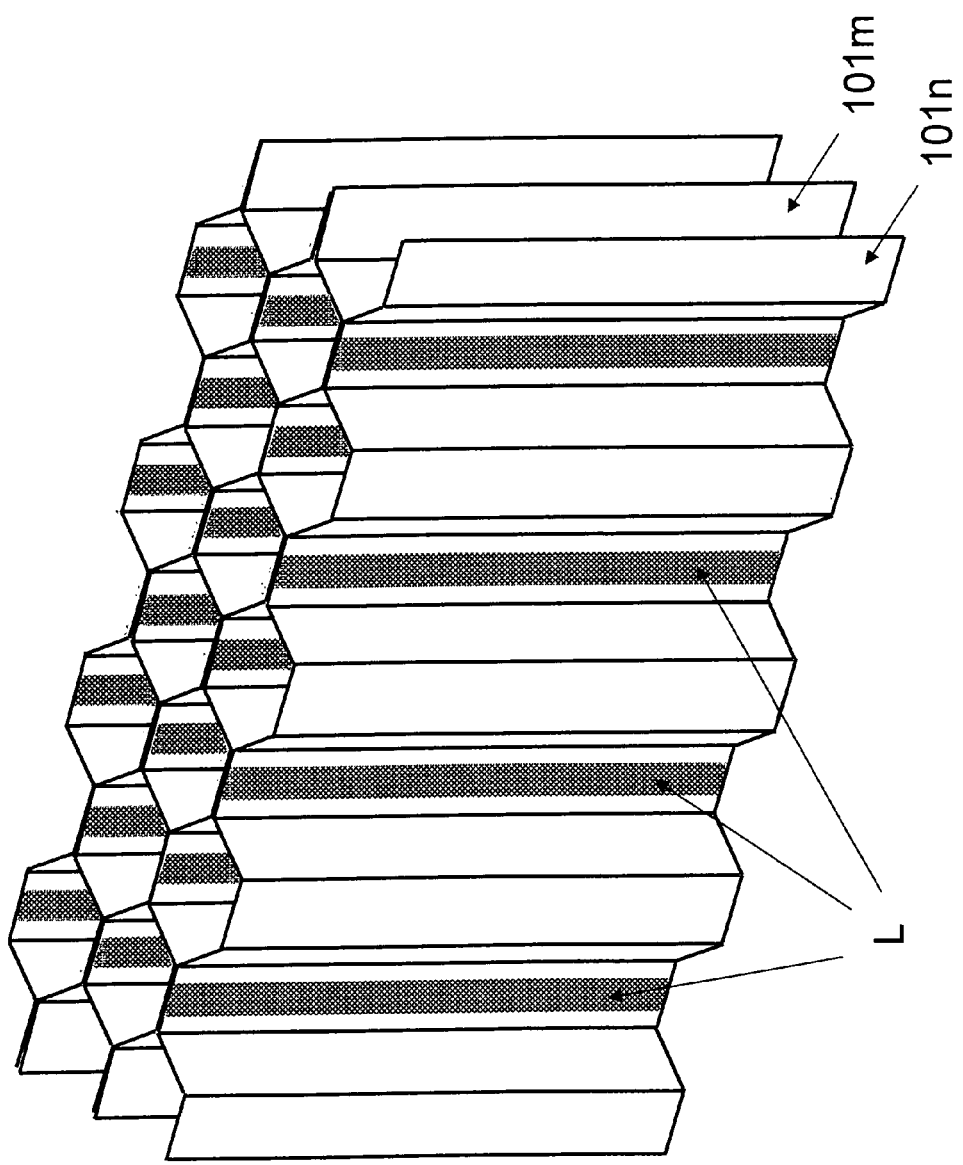
FIG. 13 is a isometric perspective view of a cell-like structure according to the invention.

FIG. 13 illustrates a cell-like honeycomb structure, according to the invention, once it is made according to the method described above. This structure is formed with different sheets assembled together, the last two adjacent sheets bearing the references 101m and 101n. Further, this FIG. 13 illustrates the continuous welding lines, parallel to the axis of the embossments and noted as L, which allow both of these adjacent sheets to be assembled at their planar areas in contact.

Each line L substantially extends over the whole of these planar areas in contact, in other words over the whole height of the structure. As indicated earlier, certain planar areas in contact may not be welded, notably in the case when very high mechanical strength is not sought.

Figure 14:
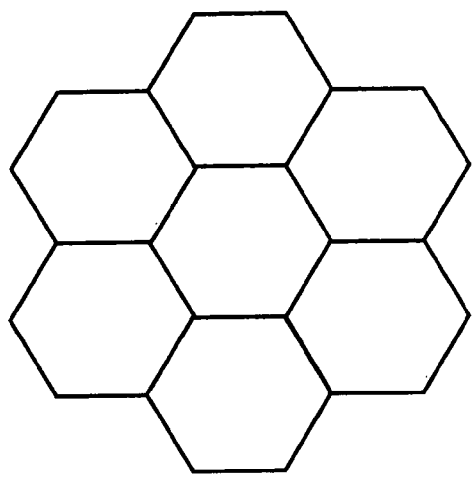
FIGS. 14-16 show a few examples of honeycomb cells which may be obtained according to the invention.
Figure 15:
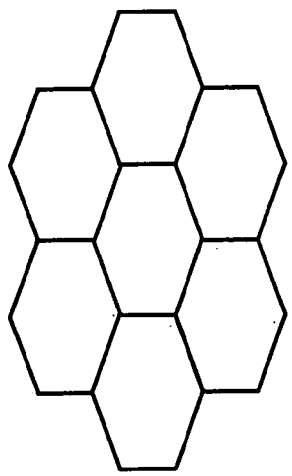
Figure 16:
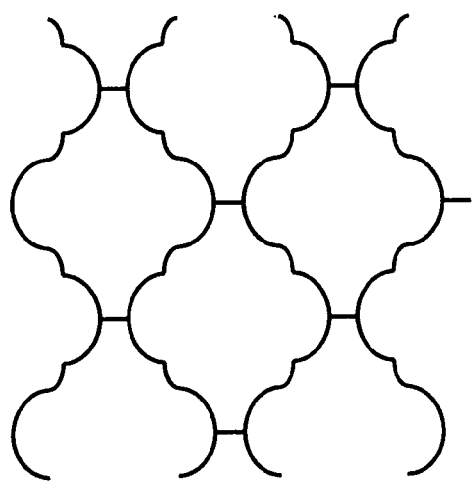

With the installation used within the scope of the invention, it is possible to make cells of the honeycomb structure, the section of which is not a regular hexagon, provided that a thermoforming cylinder 4 and corresponding steel guides 20 are machined. FIGS. 14-16 give a few examples of cell shapes which may be used within the scope of the invention, the last two allowing deformation of the honeycomb plate in at least one given direction.

The honeycomb blocks obtained with the method described earlier will advantageously be cut out into plates by a hot set of wires. The melting causes a slight accumulation of material on the surfaces, which increases the contact surface area with the skins of the sandwich structure and therefore increases the cohesion of the latter. The skins are decorative (laminate, wood) in the case of the making of furniture and partitions, notably for the interiors of pleasure boats. They are structural (composite, steel sheet) in the case of automotive and railway parts. They are both structural and decorative (lacquered aluminium, composite coated with a gelcoat) when the question is of making walls for truck trailers, campers, wind turbine nacelles . . . . But the honeycomb plate may also be used as a hollow core for a composite structure. In this case, it is coated with a sealant film and a non-woven for adhering the resin which will be applied by contact or infusion, a resin itself reinforced by one or more glass mat layers deposited at the surface of the honeycomb plate.

Further, blocks with large hexagonal mesh, manufactured from rot-proof polymer, will advantageously be used by the building industry for retaining rainwater.

Whatever the industrial application, the laser-welded plastic honeycomb provides remarkable resistance to compression, to flexure and to shearing while lightening the existing structures. With the manufacturing method, it is possible to use most thermoplastic polymers and to thereby obtain blocks with lightness and robustness which were inaccessible previously. It also allows manufacturing of parts of very great length in a single piece.

Finally, with the small bulk and the lightness of the welding installation and of the hot-wire cutting station it is possible to install these means as close as possible to large users. Consequently, only sheets provided with embossments, stacked recesswise, in specific containers will be transported, which considerably reduces logistics cost. In other words, in a first location it is possible to perform splining and cutting operations. On the other hand, the following operations, notably for welding the different sheets, may be performed in a different location, possibly at a great distance from the first location mentioned above.

In the embodiment described and illustrated with reference to the appended figures, vacuum thermoforming of an airproof thermoplastic material is applied, a material which therefore lends itself to such a thermoforming operation. However, as a non-illustrated alternative, it is possible to use a non-airproof thermoplastic material, such as for example a non-woven fabric, a grid or a perforated sheet. In this case, as described earlier, areas provided with embossments may be made within each sheet, by a method different from vacuum thermoforming. This alternative method may in a non-limiting way, be in accordance with the teaching of FR 1532509.

The invention claimed is:

1. A method for manufacturing a cell-like honeycomb structure formed with several sheets of a thermoplastic material assembled together, the method comprising:
   making in each sheet areas provided with embossments;
   assembling each free sheet with an adjacent sheet of an intermediate block formed by different sheets assembled together beforehand,
   welding with a laser source at least certain planar areas of free sheet and of the adjacent sheet that are in contact with each other, along a continuous line parallel to an axis of the embossments,
   carrying out the welding by a conduction welding process, where the laser source comprises a set of emitters having a wavelength between 800 and 1,200 nanometers;
   generating a laser beam and directing the laser beam toward a mirror provided with facets and performing a rotary movement so as to generate a laser segment,
   wherein a width of the laser segment is substantially close to a diameter of the laser beam and a length of the laser segment is much greater than the diameter of the laser beam;
   wherein this laser segment is moved along said continuous line;
   wherein the length of the laser segment is about twenty-five to seventy-five times greater than the diameter of the laser beam; and
   wherein the length of the laser segment extends in a direction parallel to the continuous line.

2. The method according to claim 1, wherein electromagnetic radiation from the laser source is transmitted through optical fibers.

3. The method according to claim 1, wherein areas provided with embossments are made by compressively marking lines alternately on a first face and on an opposite face of the sheet, and then by exerting on either side of these folding lines, pressure forces so as to cause folding of this sheet.

4. The method according to claim 3, wherein lines parallel to a width of the sheet equidistant from each other are compressively marked, and then pressure forces are exerted on either side of these folding lines in opposite directions so as to cause the folding of the sheet in the longitudinal direction according to a semi-hexagonal pattern and then this strip is cut out in order to form different sheets.

5. The method according to claim 1, wherein each free sheet is heated up, before welding it to the adjacent sheet of the intermediate block.

6. The method according to claim 1, wherein each free sheet is pressed against the adjacent sheet, during the laser welding step and immediately after this step along said continuous line.

7. The method according to claim 1, wherein the cell-like honeycomb structure has a density of less than 80 kg/m$^3$ with cells for which a largest transverse dimension is less than 12 mm.

8. The method according to claim 1, wherein the sheets are monolayer sheets in 100% recycled material containing carbon black.

9. The method according to claim 1, wherein the conduction welding process comprises:
moving the laser segment on the free sheet along said continuous line;
absorbing the laser at the free sheet;
raising a temperature of the free sheet by said absorbing;
conducting heat from the first sheet to the adjacent sheet to effect a melting of at least one of the sheets.

10. The method according to claim 9, wherein said melting comprises imparting mobility to macromolecules of the at least one of the sheets so that the macromolecules move to the other sheet where the macromolecules bond said other sheet.

11. The method according to claim 9, wherein said absorbing the laser at the free sheet comprises absorbing the laser at carbon black particles disposed in the free sheet.

12. The method according to claim 1, further comprising:
rotating the mirror at a high rate of speed;
receiving at each facet of the mirror the laser beam;
projecting the received laser beam from the facets to the sheet of thermoplastic material to from the laser segment having a substantially linear shape with a generally uniform energy distribution.

13. The method according to claim 1, wherein the laser segment is said moved along said continuous line so that temperatures of both the free sheet and the adjacent sheet at the interface of the free sheet and the adjacent sheet gradually rise to reach the melting point of the thermoplastic material to form an elongated extending, generally rectangular shaped weld line disposed upon and parallel with the continuous line.

14. The method according to claim 1, wherein the diameter of the laser beam is about two to four millimeters and the length of the laser segment is about ten to fifteen centimeters.

15. The method according to claim 1, further comprising:
a first pressing member moving the intermediate block into contact with the free sheet;
a second pressing member penetrating into cells of the intermediate block and applying a pressure between the free sheet and the adjacent sheet along the continuous line.

16. The method according to claim 15,
wherein the second pressing member comprises steel or protruded carbon profiles of a harrow;
wherein said penetrating comprises driving the harrow by pneumatic actuators into the cells and entirely through the intermediate block;
wherein said applying the pressure comprises flattening the harrow against areas of the adjacent sheet in contact with corresponding areas of the free sheet which are supported by guides, such that the respective areas of the adjacent sheet and the free sheet are compressed between the harrow and the guides; and
wherein said laser segment is moved along the continuous line during said applying the pressure.

17. The method according to claim 16, further comprising following the movement of the laser segment along the continuous line with a rotary knurl to exert a point pressure on portions of the free and adjacent sheets softened by heat imparted thereon by the laser segment and transferred through the free and adjacent sheets non-transmissively by conduction.

* * * * *